Nov. 5, 1935. W. DAVIES 2,019,523
PACKING
Filed July 1, 1933
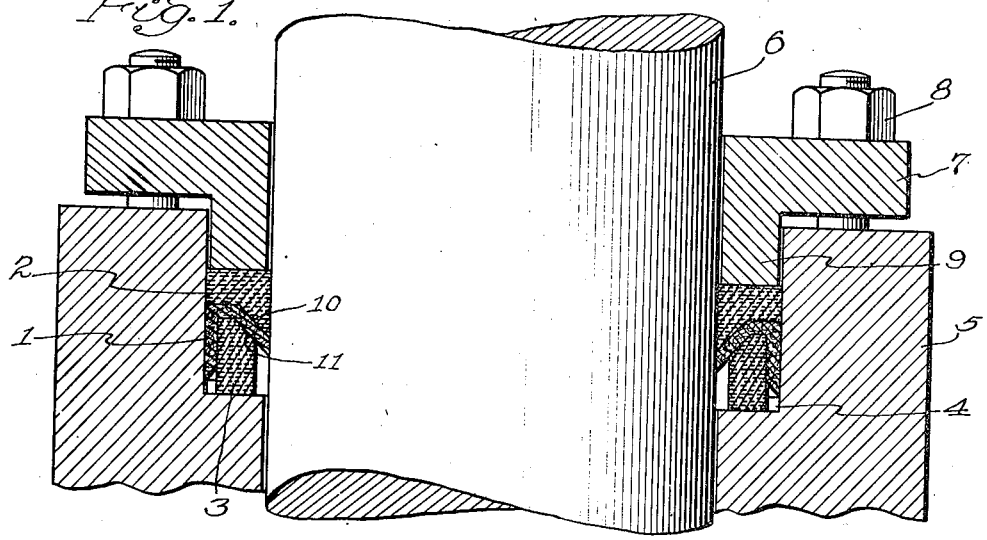
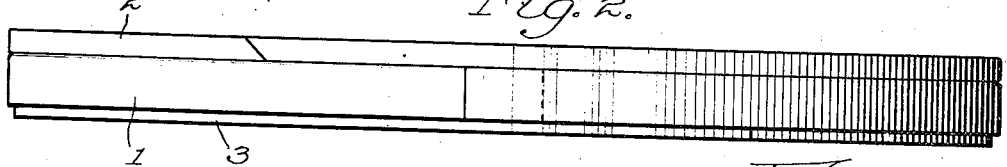
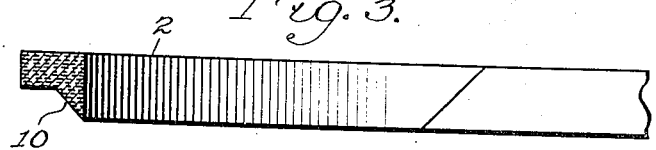
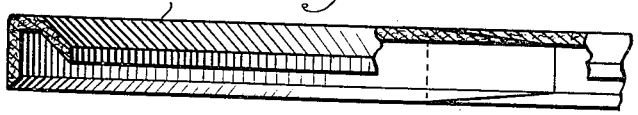
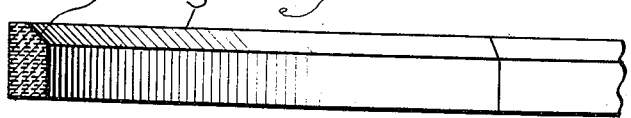
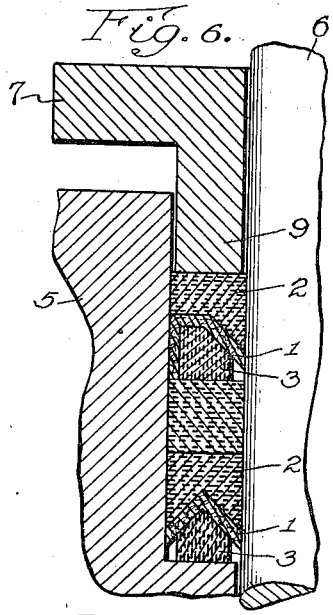
Inventor
Wayne Davies.
Witness
Arthur M. Framke.
by Rummler, Rummler & Woodworth,
Attys.

Patented Nov. 5, 1935

2,019,523

UNITED STATES PATENT OFFICE 2,019,523

PACKING

Wayne Davies, Chicago, Ill.

Application July 1, 1933, Serial No. 678,634

1 Claim. (Cl. 286—26)

This invention relates to packings and is designed with particular reference to the requirements of hydraulic presses to be applicable to cylinders or plungers which vary considerably in diameter. The packing is also applicable to rod surfaces or rotating shafts. Aside from the customary compression packing or the common cup packing, it is customary to use as the sealing element a leather ring which is U-shaped in cross section. The improved packing is of this class and utilizes a U- or V-leather ring, but the ring in this case is canted for reducing the contact area of the ring with the plunger surface or cylinder wall to only that required for sealing of the beveled edge of the ring.

The purposes of the invention are to provide improvements in packings which will enable the various elements thereof to perform their separate functions without interference for the purpose of minimizing displacement of the packing ring and to protect it from unnecessary wear or injury or jamming, and avoid the necessity for frequently shutting down the press. The improved packing is also arranged to minimize displacement of the seal member thereof, irrespective of wide variations in pressure. It is also a purpose to provide an automatic lip seal packing of reduced friction, and one which is capable of resealing or adjustment after leakage occurs, and which may be used as a compression packing in an emergency until a change may be made during non-productive time.

It is also a purpose of the invention to provide a packing arrangement which is adaptable to plungers of any diameter or to recesses or stuffing boxes of variable depth and width.

The accompanying drawing illustrates the improved packing.

Figure 1 of the drawing is a sectional detail of the packing, packing gland and the cylinder, and indicates a portion of the plunger.

Fig. 2 is a side view of the packing.

Figs. 3, 4 and 5 are respectively sectional details of the foot ring or base, sealing ring, and filler ring or spreader of the packing.

Fig. 6 is a sectional detail of a double packing.

One purpose of the construction is to minimize the contact area of the leather sealing member of the packing to a distinct, narrow, annular ring provided for by the inner beveled edge of the packing. The opposite wall of the leather element may have considerable bearing area as it engages the relatively stationary recess wall of the cylinder.

The engaging or sealing edge of the sealing element is pressed firmly against the surface of the plunger or the cylinder wall by a medium such as oil, water, air or gas, which operates the plunger but is protected against the unnecessary wear by the bearing base or foot of the packing. The latter, as it wears down is, by the pressure of the sealing ring, made to conform to the plunger surface, rod, shaft, or cylinder wall surfaces with which the packing has a relative movement. The sealing edge of the sealing ring follows the bearing base as the latter wears.

In the manufacture of the leather sealing members of hydraulic packings, it is customary to impregnate the leather with wax compounds and to cut and form the leather into continuous rings of the exact dimensions for the various sizes of packings required. The leather element of the present packing is treated in the same manner and is of substantially the same U-form in cross section, but in the forming is made in lengths sufficient for a number of packings and is spirally wound on a mandrel of less diameter than that of the ultimate packing, and is permitted to set and harden on the mandrel. Then, when it is unwound and formed into packing rings of larger diameter than the mandrel, the U becomes deformed into a distorted V-shape as shown in the drawing. The outer wall of the U-ring will stand parallel with the packing recess wall of the cylinder. The other inner wall of the packing inclines toward the plunger so that its edge only engages the latter.

The angle of the lip of the sealing ring is cut to conform with the surface engaged, and the sealing ring is backed by a low friction material impervious to water or other pressure medium for the purpose of reducing friction and wear in the area of packings which normally are most subject to friction and wear. Thus the sealing member is left to function in a zone of less wear as a seal member only.

Aside from the sealing ring, there are two other elements to the packing, one a foot or bearing base, and the other a filling and wedging ring or spreader. These two elements of the packing are made of a plurality of superposed layers of cotton duck vulcanized together under pressure, or other suitable material moulded or laminated and sliced to shape. The sealing ring and the foot or bearing ring are not continuous and have beveled or lapped joints. The filling ring has a butt joint. The joints are staggered in the assembled packing. There is considerable convenience in this manner of manufacturing the article as it is necessary to provide for a great number of ring sizes and dimensions, and in the old method of forming continuous rings for this type of packing it was impracticable to carry in stock packings of a large number of sizes and also to be equipped with the necessary forming dies for such different sizes.

The drawing shows the elements of the above described construction as follows: 1 is the leather sealing element, 2 the foot or bearing, and 3 the filler or spreader. The packing recess of the cylinder is indicated at 4. 5 is the cylinder wall, and 6 is the piston or plunger. 7 is the packing gland and 8 the nuts for drawing the gland flange 9 against the packing. The packing is stationary with the cylinder and the elements of the packing which rub against the wall of the moving piston are the leather ring 1 and the foot or bearing member 2 of the packing. As the latter wears down, the pressure of the operating fluid causes the ring to expand internally and to be followed by the inner flange of the sealing ring. The inner inclined wall of the sealing ring is wedged between the inclined surfaces 10 and 11 respectively of the bearing ring and the filler ring.

The operation of the packing is apparent from the drawing. Pressure of the fluid under the inner beveled edge of the leather ring forces this edge into sealing relation with the plunger. It is a split ring and can adjust itself to the diameter of the piston. An excessive bearing area between the piston and sealing ring is more likely to result in leaks than this minimum bearing area provided by the present construction, and it is not subject to distortion and the troublesome results from improperly designed packing rings which so frequently occur with hydraulic presses and similar apparatus using fluids under high pressure.

The unsupported area of the sealing member is reduced to a minimum by the use of a foot ring and consequently is suitable for worn equipment. The reduced leather contact against the plunger surface, rotating rod, or relatively movable cylinder wall enables the packing to withstand higher temperatures than is possible with the uncanted U-shaped leather packing. A foot piece behind the sealing member is of heat resisting material and aids in drawing heat from and insulating the sealing member. The plunger temperatures are higher on hot presses than the cylinder walls. The sealing member is assisted in conforming to the plunger surface by the spacer or wedge ring which holds the outer flange of the sealing ring parallel against the stationary surface or back wall of the recess in the cylinder in the case of a neck packed hydraulic plunger.

It is to be understood that details of the construction shown may be altered or omitted without departing from this invention as defined by the following claim:

I claim:

A plunger packing including a pliable packing ring, a ring-shaped base of deformable material having an inside diameter substantially that of the plunger to be packed and also having an axial tapering lip extending along the plunger, said base having a surface at one side extending in part at right angles to the axis of the base, to form a gripping face for the packing ring, and in part at an angle inclined to said gripping face along the adjacent surface of said lip, and a ring-shaped spreader of substantially greater inside diameter than the plunger to be packed having ring engaging surfaces of similar shape to, and conformable with, the angular surfaces of the base, the sealing ring being disposed between the base and spreader and having a portion thereof gripped between the co-acting right angular surfaces of the latter, and also having an inclined portion between, and controlled by, the inclined surface of the base and spreader, which inclined portion of the sealing ring extends at its inner edge flush with the inner plunger engaging surface of the base and substantially beyond the inner surface of the spreader.

WAYNE DAVIES.